May 5, 1959

F. P. MARTIN 2,884,752

HYDRAULICALLY OPERATED RECIPROCATING
CUTTING ASSEMBLY

Filed Aug. 6, 1956

INVENTOR.
Fred P. Martin.
BY
Fishburn and Gold
ATTORNEYS.

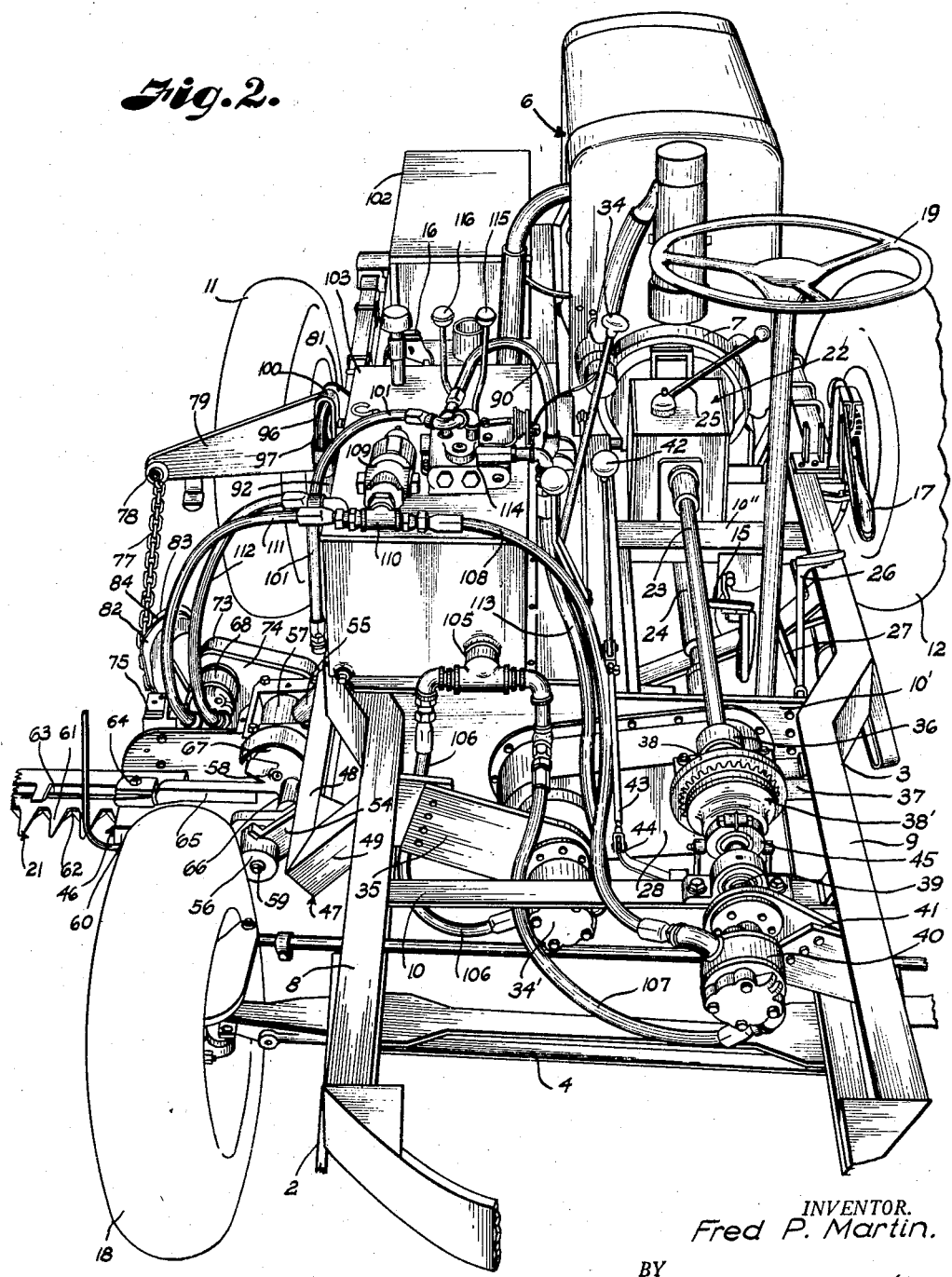

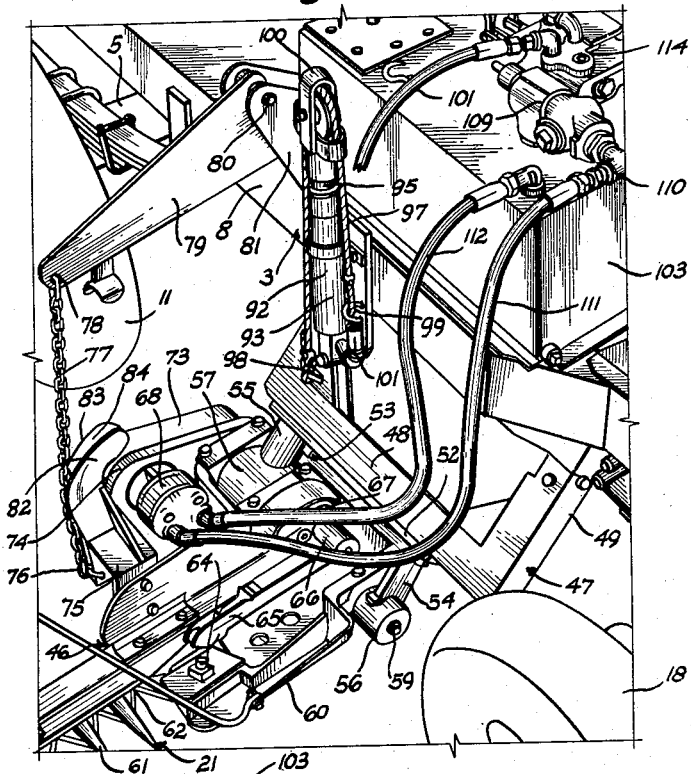

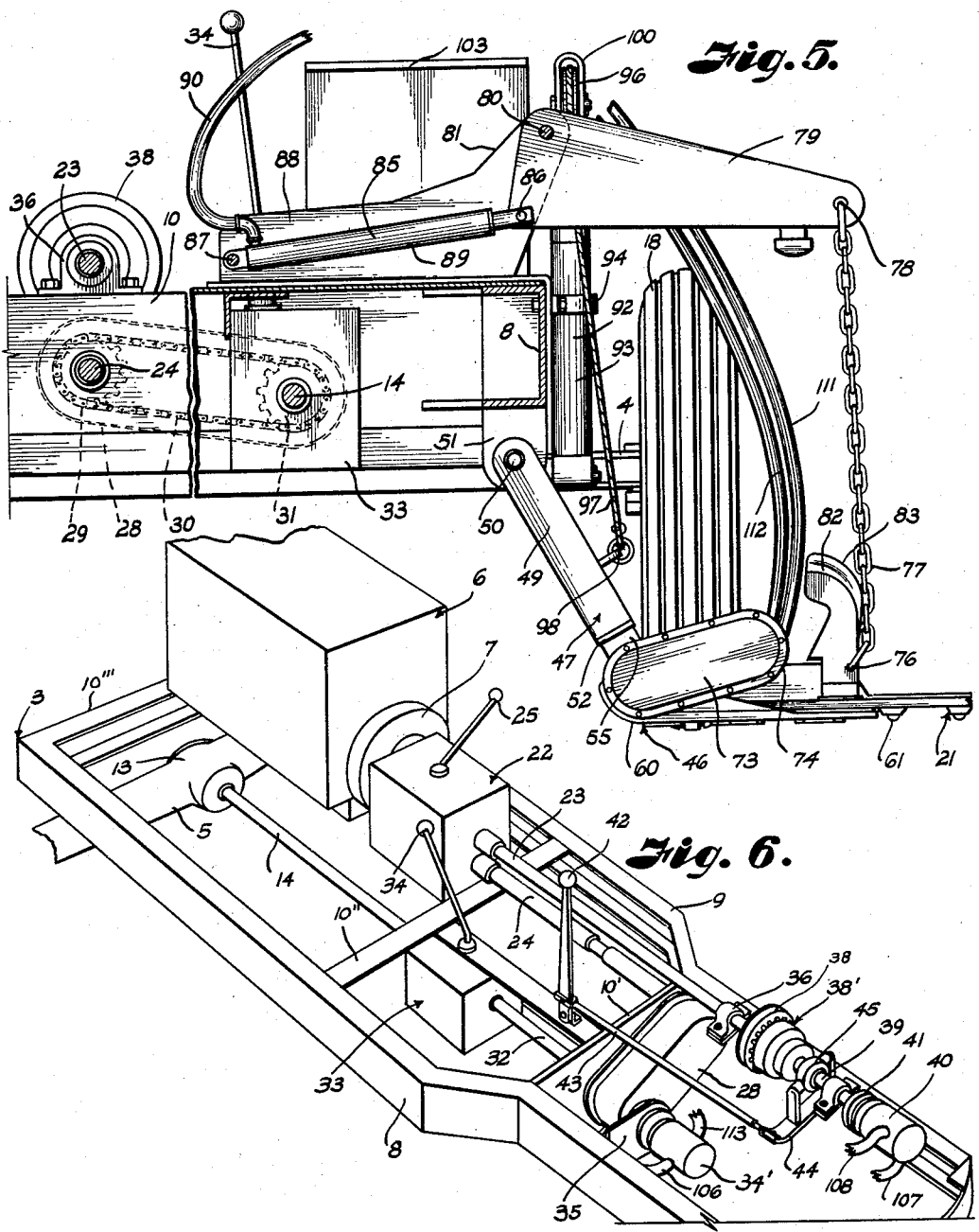

United States Patent Office 2,884,752
Patented May 5, 1959

2,884,752

HYDRAULICALLY OPERATED RECIPROCATING CUTTING ASSEMBLY

Fred P. Martin, Topeka, Kans.

Application August 6, 1956, Serial No. 602,181

5 Claims. (Cl. 56—25)

This invention relates to mowers, particularly to those of the power driven type wherein a sickle is carried on a self-propelled vehicle and supported for operation at various lateral angles of inclination relative to the machine and driven for use in cutting vegetation along the shoulders of any ditches and embankments of highways, railways and the like.

Sickles have been mounted on tractors and other self-propelled vehicles for mowing shoulders along highways. Usually such mowers have ample power built in the engines thereof, but due to low speeds of the vehicle in mowing operations, all of the power of the engine is not usable and some of the advantages of hydraulic drives have not been attainable.

The principal objects of the invention are to provide a self-propelled mowing machine with selective speed transmission mechanism for the sickle and vehicle, for more usable power in all mowing operations at desired mowing speeds of the vehicle; to provide such a mowing machine with a selective two-speed transmission between the clutch for the engine and a second multiple speed transmission which second transmission is operably connected through the differential with the traction wheels of the machine and with an hydraulic motor operably connected with the first transmission for supplying a fluid pressure for driving a sickle and a second hydraulic motor operably connected with the drive of the second transmission for supplying a fluid pressure for operating devices to selectively position the sickle at desired heights and inclinations; to provide such a machine with an hydraulic motor for driving the sickle wherein there is a speed reduction between said motor and sickle; to provide a mowing machine wherein the sickle positioning mechanism and drive is hydraulic; to provide such a mowing machine and power supply wherein the engine is at the rear of the vehicle over the drive wheels and the transmission and the hydraulic mechanism is forwardly of the engine for a relatively low height of enclosing structures and increased visibility forwardly of the vehicle; to provide a mowing machine with a flexibility of operation together with a location of controls for efficient operation with increased usable power in all mowing operations together with relatively high speed during transportation from one site to another; and to provide such a mowing machine with hydraulic drives for the sickle mechanism and pressure release therefor to eliminate damage in the event the sickle is moved into a solid obstacle and the like.

In accomplishing these and other objects of the present invention, I have provided improved details of structure, the preferred form of which is illustrated in the accompanying drawings, wherein:

Fig. 1 is a perspective view of a mower embodying the features of the present invention with the sickle in raised position for transportation.

Fig. 2 is an enlarged perspective view of the mower machine chassis with the forward housing removed to illustrate the positions of the controls and hydraulic mechanism drives.

Fig. 3 is a detailed fragmentary perspective view of the mowing machine showing the sickle shoe and mounting therefor.

Fig. 4 is a transverse sectional view through a portion of the mowing machine particularly illustrating the sickle mounting and elevating mechanism therefor.

Fig. 5 is a transverse sectional view through the mowing machine with parts broken away and showing the sickle mounting in sickle lowered position.

Fig. 6 is a perspective view of the chassis of the vehicle and power supply for the mowing machine.

Referring more in detail to the drawings:

1 designates a mowing machine constructed in accordance with the present invention and which includes an automotive type chassis 2 comprising, a main frame 3, front and rear axle units 4 and 5 respectively and a prime mover or power unit 6 including a conventional engine and a clutch (not shown) enclosed in a conventional bell housing 7.

The main frame 3 includes longitudinal side members 8 and 9 connected by a plurality of suitable spaced cross members 10, 10', 10'' and 10'''. The rear axle unit includes traction wheels 11 and 12 that are operated from a differential mechanism enclosed in a differential housing 13. The differential mechanism is operated from the power unit 6 through suitable transmission mechanism and a drive shaft 14 as later described. The traction wheels 11 and 12 are equipped with conventional hydraulic brakes actuated from a foot pedal 15 as in conventional practice and are also provided with individual mechanical brakes actuated from hand levers 16 and 17 respectively through cables or rods (not shown). The front axle unit includes wheels 18 that are steered through a suitable linkage with a steering wheel 19 located adjacent the operator's seat 20, the operator's seat being carried by the frame 3 forwardly of the power unit 6 and substantially in line with the sickle 21 which extends laterally from the chassis as later described.

The engine of the power unit 6 under control of the clutch in the housing 7 is operatively connected with a multiple speed selective speed reduction unit or transmission 22 having gearing in a housing which has output shafts 23 and 24. The gearing in said speed reduction unit 22 is controlled by a lever 25, the output shaft 23 being operatively connected with the engine whereby said output shaft is rotated at the same speed as the engine. The output shaft 24 is selectively operated at engine speed or at a reduced speed as for example at a 2½ to 1 ratio, the 1 to 1 ratio being for use when moving the mower down a highway from one site to another, and the 2½ to 1 ratio being used for mowing operations. The clutch in the housing 7 is operated by a foot pedal 26 connected therewith by a suitable linkage 27 whereby power from the engine is disconnected when the gears in the speed reduction transmission unit 22 are shifted by the lever 25.

The output shaft 24 extends into a housing 28 and has a sprocket 29 fixed thereon. The sprocket 29 is operatively connected by a chain 30 with a sprocket 31 fixed on a shaft 32 which extends rearwardly from the housing 28 to a multiple speed selective speed reduction unit or transmission 33 wherein the gears are shifted by a conventional gear shift lever 34 to effect driving connection with the forward end of the drive shaft 14 of the transmission unit 33. The transmission 33 is preferably a standard automotive multiple speed transmission unit such as a four-speed transmission. The housing 28 is preferably suitably mounted and supported on a cross member 10' of the frame 3 forwardly relative to the multiple speed transmissions 22 and 33. This dual transmission between the power unit 6 and the rear wheels is such that power from the power unit is transmitted to the clutch in the housing 7 and through gears in the transmission unit 22 to the output shaft 24 preferably either at 1 to 1 or 2½ to 1 ratio, through the sprocket 29, chain 30, sprocket 31, shaft 32 and selected gear ratio in the transmission unit 33, drive shaft 14, differential gearing in the housing 13 to the rear wheels 11 and 12. The four speeds in the transmission unit 33 as in conventional automotive construction has three forward speeds and one reverse whereby through the combination of the transmission units 22 and 33 the mowing machine has a variety of six forward speeds and two reverse speeds to give a range to accommodate both desirable mowing speeds and desirable speeds for movement of the machine along a highway from one site to another.

The forward end of the shaft 32 extends through the housing 28 and is operatively connected for driving an hydraulic pump 34' supported on a bracket 35 extending from the frame member 8 to supply hydraulic fluid for sickle moving mechanism as later described. The output shaft 23 has a forward portion rotatably supported in a self-aligning bearing 36 carried on a bracket 37 on the frame member 9, the forward end of the shaft 23 is connected to a driving member 38 of a clutch 38' having a driven member connected with a shaft 39 drivingly connected to an hydraulic pump 40 supported on a bracket 41 extending from the frame member 9. The clutch 38' is controlled by hand lever 42 which is connected by a rod 43 and linkage 44 to a throw out collar 45 whereby the clutch 38' may be engaged to drive the pump 40 during mowing operations and disengaged whereby the pump 40 is idle during transportation of the machine.

The mower mechanism 46 which includes the sickle 21 is carried by a sub-frame 47 which includes a U-shaped member having a bar 48 with spaced legs 49, the free ends of which are pivotally mounted on pins 50 supported in depending ears 51 fixed on the frame member 8 whereby the axis of the pins 50 extend longitudinally of the frame 3 or longitudinally of the direction of travel of the mowing machine and the sub-frame is swingable for up and down movement about said axis. The ears 51 are spaced longitudinally of the frame 3 between the axle units whereby the sub-frame which extends generally laterally of the chassis is positioned between the front and rear wheels adjacent the side member 8. The sub-frame 47 includes an extension having a plate 52 removably mounted on the bar 48 by suitable fastening devices such as bolts 53 and having spaced arms 54 and 55 extending outwardly therefrom and terminating in bearings 56 and 57 respectively in axial alignment with the axis of said bearings parallel to the axis of the pins 50. The bearing 57 mounts a crank shaft 58 and the bearing 56 mounts an aligning pivot pin 59, the shaft 58 and pin 59 having projecting portions to pivotally mount a sickle shoe 60. The sickle 21 includes a sickle guard 61 having teeth 62 wherein a sickle bar 63 is reciprocably mounted as in conventional sickle construction. The inner end of the sickle is suitably pivotally connected as at 64 to one end of a pitman 65, the other end of which is pivotally mounted as at 66 on a crank pin extending from a crank disk 67 secured to the crank shaft 58 whereby rotation of the crank shaft reciprocates the sickle bar. The other end of the crank shaft 58 is operatively connected with an hydraulic motor 68 in a manner to provide a suitable speed reduction.

In the illustrated structure, sprocket 69 is fixed on the crank shaft 58 and a sprocket 70 is fixed on the hydraulic motor shaft 71 and operatively connected by a chain 72 enclosed in a housing 73 supported on a plate 74 fixed relative the shoe 60. The sprocket 69 is preferably twice the diameter of the sprocket 70 to give a 2 to 1 speed reduction with a corresponding increase in torque applied to the sickle. The plate also carries the hydraulic motor 68 whereby the hydraulic motor and sprocket swing with the shoe on the axis of the bearings 56 and 57 and the hydraulic motor when actuated rotates the crank shaft 58 to effect reciprocation of the sickle bar 63 for mowing operations.

The shoe 60 includes an upstanding bracket 75 preferably adjacent the hydraulic motor 68 and spaced outwardly therefrom which is suitably connected as at 76 to one end of an elongated flexible member such as the chain 77. The other end of said flexible member 77 is suitably connected as at 78 to one end of an arm 79 extending laterally of the frame 3 in substantially vertical alignment with the bracket 75. The arm 79 is pivotally mounted on a pin 80 carried by spaced upwardly extending ears 81 fixed on the frame member 8 with the axis of the pin 80 extending longitudinally of the mowing machine. The bracket 75 includes an upstanding extension 82 provided with an arcuate upper end 83 and having a groove 84 aligned with the elongated flexible member 77 to act as a lever arm to hold the lower portion of the chain outwardly from the axis of the crank shaft 58 when the sickle is swung downwardly below a horizontal, the extension substantially maintaining the moment arm from the axis of the crank shaft to the chain for facilitating upward swinging of the sickle when it is desired to raise same or change the inclination thereof. The lever arm 79 is preferably shaped to provide a bell crank action and in the illustrated structure one end of an extensible hydraulic member 85 is pivotally connected as at 86 to a point spaced from the pivot pin 80 and the other end of the hydraulic extensible member 85 is pivotally connected as at 87 to a bracket 88 that is preferably an extension of the ears 81 whereby the extensible member 85 extends towards the center of the chassis as illustrated in Fig. 5. Extension of said extensible member 85 swings the outer end of the lever arm 79 upwardly and through its connection by the chain 77 with the shoe 60 swings the shoe and sickle upwardly about the axis of the crank shaft 58 and pin 59. Contraction of the extensible member 85 is permitted when the pressure is removed from inside the cylinder 89 thereof, the weight of the mower mechanism being such that gravity will cause the sickle to swing downwardly pulling the arm 79 downwardly as shown in Fig. 5 to cause said contraction of the extensible member 85. In the illustrated structure, the hydraulic extensible member 85 is extended by means of hydraulic pressure supplied through a conduit 90 to the end of a cylinder 89 adjacent to pin 87 as later described.

Swinging movement of the sub-frame 47 is effected by an extensible member 92 which preferably includes an hydraulic cylinder 93 suitably secured to the frame member 8 at the outer side thereof as by mounting members 94 whereby the cylinder is upstanding alongside thereof with a piston rod 95 extending from the upper end of the cylinder and having a grooved pulley 96 rotatably mounted on the upper end of said piston rod. An elongated flexible member such as a cable 97 has one end fixed as at 98 to one of the legs 49 of the U-shaped frame member of the sub-frame in spaced relation to the pin 50, said elongated flexible member extending upwardly and operatively engaged with the pulley 96 and then downwardly with the other end suitably secured as at 99 in fixed relation to the frame member 8. Suitable guides 100 are arranged to retain the cable 97 in engagement with the pulley 96. The extensible member 92 is preferably of the single action type whereby hydraulic pressure is supplied through a conduit 101 in the lower end of the cylinder to extend the extensible member and the extension thereof swinging the sub-frame 47 upwardly, and release of the pressure applied through the conduit 101 allowing the weight of the sickle to cause downward swinging of the sub-frame and contraction of the extensible member.

The mowing mechanism extends laterally from the frame member 8 and the power unit 6 is arranged rearwardly of the operator's seat 20 and is substantially all mounted to the side of the longitudinal center of the frame 3 toward the side frame member 9 whereby the weight of the operator and prime mover tend to counterbalance the overhanging weight of the mower mechanism. In the illustrated structure, a tool box 102 is mounted at the side of the power unit toward the side frame member 8 and a tank 103 is positioned adjacent the frame member 8 with the rear end forwardly of the lever 79 in a position whereby the operator in the seat 20 has the sickle in view as well as the area forwardly thereof during all mowing operations. A fuel tank 104 is suitably supported on the frame 3 adjacent to the forward end thereof and above the hydraulic pumps 34' and 40 where it is of low height whereby the operator has good visibility ahead of the mowing machine. The tank 103 is adapted to contain hydraulic fluid for the hydraulic apparatus now to be described.

The tank 103 is provided with a fitting 105 providing communication with flexible hoses 106 and 107 connected with the inlets of the pumps 34' and 40 respectively. The discharge of the pump 40 is connected by a flexible hose 108 to a pressure relief valve 109 preferably mounted on the tank 103, the relief valve having communication with the interior of said tank. The relief valve is of conventional structure and is adjustable to a desired maximum pressure, for example, 1000 pounds per square inch. The pressure line 108 has communication through a fitting 110 connected with the pressure relief valve 109, a flexible hose 111 communicating with the inlet of the hydraulic motor 68, the discharge of said motor being connected by a flexible hose 112 to the tank 103 whereby operation of the pump 40 delivers hydraulic fluid under pressure to the hydraulic motor 68 to rotate the crank shaft 58 and reciprocate the sickle bar for mowing and since the mowing speeds of the machine in forward movement of the vehicle is at a lower ratio while the pump 40 is driven at the same r.p.m. as the power unit an increased usable power is supplied to the sickle. The discharge of the pump 34' is connected by a flexible hose 113 to a dual valve housing 114 which in the illustrated structure is mounted on the tank 103. The valves are controlled by levers 115 and 116, said valves preferably being of conventional type whereby when the valve lever 115 is moved in one direction it establishes communication from the pressure supplied by the hose 113 to the conduit 101 leading to the extensible member 92 to effect extension of same and when the valve lever 115 is moved in the other direction the pressure supplied to the conduit 101 is cut off and said conduit 101 provided with communication to the tank 103. Intermediate positions of the valve lever 115 closes the communication with the duct 101 so as to hold the extensible member 92 in selected position to maintain the height of the shoe from the ground as desired. When the valve lever 116 is moved in one direction communication from the pressure supply of the hose 113 is provided through the conduit 90 to extensible member 85 to swing the lever 79 and corresponding swinging movement of the sickle. Intermediate position of the valve lever 116 closes the supply to the duct 90 to maintain the extensible member 85 in selected position and movement of the valve lever 116 in the other direction provides communication from the duct 90 to the tank 103 whereby gravity will cause the sickle to swing downwardly.

In operating a machine constructed and assembled as described, and assuming that the engine of the power unit 6 is operating, the clutch pedal 26 is depressed to disengage the clutch in the housing 7. The shift lever 25 is then moved to engage the gears in the transmission unit 22 whereby the shaft 24 is driven at a 1 to 1 ratio relative to the engine speed. The gear shift lever 34 is then operated to put the gears in the transmission unit 33 in high gear. The clutch in the housing 7 is then reengaged and the machine driven to a site where mowing operations are to be performed. When such site is reached the clutch pedal 26 is again depressed and the gear shift lever 25 operated whereby the gears in the transmission unit 22 are engaged to drive the shaft 24 at a lower ratio relative to the engine speed. The gear shift lever 34 is then operated to move the gears in the transmission unit 33 to provide a desired forward speed of the vehicle for mowing operations. The clutch is then reengaged for desired forward movement of the machine at which time the pump 34' is driven to provide fluid pressure through the hose 113 to the valve housing 114. The valve lever 115 is then actuated to allow lowering of the sickle shoe to a desired height, then the valve lever 116 is operated to adjust the angular elevation of the sickle relative to the machine which may be inclined from a full 90 degrees up to 80 degrees down from horizontal without affecting in any way the height of the sickle. The clutch lever 42 is then manipulated to engage the clutch 38' whereby the pump 40 is driven from the shaft 23 at the same r.p.m. as the engine of the power unit 6 to supply fluid pressure to the hydraulic motor 68 to rotate the crank shaft 58 and reciprocate the sickle bar. The connection from the motor 68 to the crank shaft has a speed reduction of 2 to 1. The arrangement of the various drives is such that at mowing speed, for example 4 miles per hour, the engine has a high r.p.m. and delivers more power. The pump 40 has the same r.p.m. as the engine and the speed of the motor 68 is stepped down to the sickle providing more usable power from the engine 6. As mowing proceeds and by manipulation of the valve levers 115 and 116 the elevation and angle of the sickle may be adjusted as desired to provide the height of cut and desired conformity to the terrain being mowed. With the sickle properly adjusted, it can be made to closely follow the ground contour and yield a uniform stubble. Should one of the traction wheels encounter a soft place in the ground and lose its traction, the brake for that wheel may be applied to divert power to the other traction wheel through the differential mechanism to continue forward movement of the machine.

It is believed obviously I have provided a mowing machine that is well balanced, provides the operator with maximum visibility, has a wide variety of speeds both for transportation and for mowing and also a power supply for mowing operations that is substantially independent of the vehicle drive and yet has more usable power in mowing operations than in conventional mowing machines.

What I claim and desire to secure by Letters Patent is:

1. A mower including a wheeled frame, a sub-frame pivotally mounted at one side of the wheel frame for vertical swinging movement relative thereto, means carried by the wheeled frame and connected with the sub-frame for raising and lowering same, a reciprocating sickle including a sickle shoe, means supporting the sickle shoe on the sub-frame for vertical swinging movement, crank means rotatably mounted on the sickle shoe and having driving connection with the sickle, means carried by the wheeled frame and connected with the sickle shoe for raising and lowering same, an hydraulic motor supported on the sickle shoe, speed reducing means operatively connecting the hydraulic motor with the sickle driving crank means for driving same, an hydraulic pump supported on the wheeled frame for supplying fluid pressure to the hydraulic motor for driving same, an engine supported on the wheeled frame, driving means operatively connected with the wheeled frame for propelling same and including a multiple speed selective speed-reduction unit, a transmission unit having a clutch controlled input shaft operatively connected with the engine and a plurality of output shafts selectively driven at different relative speeds, means operatively connecting one of said output shafts with the multiple speed reduction unit for driving same to propel the wheeled frame, and means including a clutch operatively connecting the other output shaft of said transmission with the hydraulic pump for driving same.

2. A mower including a wheeled frame, a sub-frame pivotally mounted at one side of the wheeled frame for vertical swinging movement relative thereto, means carried by the wheeled frame and connected with the sub-frame for raising and lowering same, a reciprocating sickle including a sickle shoe, means supporting the sickle shoe on the sub-frame for vertical swinging movement, means carried by the wheeled frame and connected with the sickle shoe for raising and lowering same, an hydraulic motor supported on the sickle shoe, speed reducing means operatively connecting the hydraulic motor with the sickle for driving same, an hydraulic pump supported on the wheeled frame for supplying fluid pressure to the hydraulic motor for driving same, an engine supported on the wheeled frame, a transmission unit having a clutch controlled input shaft operatively connected with the engine and an output shaft, and means including a clutch operatively connecting the output shaft of said transmission with the hydraulic pump for driving same.

3. A mower including a wheeled frame, a sub-frame pivotally mounted at one side of the wheeled frame for vertical swinging movement relative thereto, means carried by the wheeled frame and connected with the sub-frame for raising and lowering same, a reciprocating sickle including a sickle shoe, means supporting the sickle shoe on the sub-frame for vertical swinging movement, means carried by the wheeled frame and connected with the sickle shoe for raising and lowering same, an hydraulic motor supported on the sickle shoe, speed reducing means operatively connecting the hydraulic motor with the sickle for driving same, an hydraulic pump supported on the wheeled frame for supplying fluid pressure to the hydraulic motor for driving same, an engine supported on the wheeled frame, driving means operatively connected with the wheeled frame for propelling same and including a multiple speed selective speed-reduction unit, a transmission unit having a clutch controlled input shaft operatively connected with the engine and a plurality of output shafts selectively driven at different relative speeds, one of said output shafts having driving connection with the hydraulic pump, and means operatively connecting one of said output shafts with the multiple speed reduction unit for driving same to propel the wheeled frame.

4. A mower including a wheeled frame, a sub-frame pivotally mounted at one side of the wheeled frame for vertical swinging movement relative thereto, means carried by the wheeled frame and connected with the sub-frame for raising and lowering same, a reciprocating sickle including a sickle shoe, crank means rotatably mounted on the sickle shoe and having driving connection with the sickle, an hydraulic motor supported on the sickle shoe, speed reducing means operatively connecting the hydraulic motor with the sickle driving crank means for driving same, an hydraulic pump supported on the wheeled frame for supplying fluid pressure to the hydraulic motor for driving same, an engine supported on the wheeled frame, driving means operatively connected with the wheeled frame for propelling same and including a multiple speed selective speed-reduction unit, a transmission unit having a clutch controlled input shaft operatively connected with the engine and a plurality of output shafts selectively driven at different relative speeds, means operatively connecting one of said output shafts with the multiple speed reduction unit for driving same to propel the wheeled frame, and means including a clutch operatively connecting the other output shaft of said transmission with the hydraulic pump for driving same.

5. A mower including a wheeled frame, a sub-frame pivotally mounted at one side of the wheeled frame for vertical swinging movement relative thereto, hydraulic extensible means carried by the wheeled frame and having connection with the sub-frame for raising and lowering same, a reciprocating sickle including a sickle shoe, means supporting the sickle shoe on the sub-frame for vertical swinging movement, crank means rotatably mounted on the sickle shoe and having driving connection with the sickle, hydraulic extensible means carried by the wheeled frame and having connection with the sickle shoe for raising and lowering same, an hydraulic motor supported on the sickle shoe, speed reducing means operatively connecting the hydraulic motor with the sickle driving crank means for driving same, an hydraulic pump supported on the wheeled frame for supplying fluid pressure to the hydraulic motor for driving same, an engine supported on the wheeled frame, driving means operatively connected with the wheeled frame for propelling same and including a multiple speed selective speed-reduction unit, a transmission unit having a clutch controlled input shaft operatively connected with the engine and a plurality of output shafts selectively driven at different relative speeds, means operatively connecting one of said output shafts with the multiple speed reduction unit for driving same to propel the wheeled frame, means including a clutch operatively connecting the other output shaft of said transmission with the hydraulic pump for driving same, a second hydraulic pump, means driven by said one output shaft of said transmission and having driving connection with said second hydraulic pump for driving same to supply fluid under pressure to said hydraulic extensible means, and valved flow means from said second hydraulic pump to the respective hydraulic extensible means for selectively supplying fluid pressure thereto.

References Cited in the file of this patent

UNITED STATES PATENTS

| 1,958,405 | Anthony et al. | May 15, 1934 |
| 2,129,435 | Morris | Sept. 6, 1938 |
| 2,588,002 | Holmes | Mar. 4, 1952 |
| 2,616,234 | Love | Nov. 4, 1952 |
| 2,757,504 | Elfes | Aug. 7, 1956 |
| 2,767,539 | Huddle | Oct. 23, 1956 |